United States Patent [19]

Barrett, Jr.

[11] 4,455,356
[45] Jun. 19, 1984

[54] BELLOWS BOOT FOR SECONDARY BATTERY TERMINALS

[76] Inventor: James H. Barrett, Jr., 5055 Golf Creek Rd., Sylvania, Ohio 43560

[21] Appl. No.: 481,986

[22] Filed: Apr. 4, 1983

[51] Int. Cl.³ .............................................. H01M 4/00
[52] U.S. Cl. .......................................... 429/66; 429/8; 429/121; 429/122; 429/178
[58] Field of Search ...................... 429/66, 8, 121, 122, 429/178, 185

[56] References Cited

U.S. PATENT DOCUMENTS

| | | | |
|---|---|---|---|
| 2,257,489 | 9/1941 | Wells | 429/66 |
| 2,261,597 | 11/1941 | Sutherland | 429/66 |
| 3,661,646 | 5/1972 | Barrett, Jr. | 429/208 |
| 3,956,576 | 5/1976 | Jensen et al. | 429/121 X |

Primary Examiner—Charles F. LeFevour
Attorney, Agent, or Firm—Hugh Adam Kirk

[57] ABSTRACT

A non-leaking flexible plastic bellows connection between the cover and the lead terminal of a secondary battery expandable plate, including circumferential grooves around the terminal for molding thereto one end of the plastic bellows while the other end is sealed to the plastic cover of the battery or formed integral therewith. The grooves in the upper end of the lead terminal may be formed in the terminal or in a sleeve of softer lead composition integrally attached to the end of the terminal. The lead cell connectors are integrally attached to the upper outer ends of these lead sleeves or terminals above the grooves therein.

10 Claims, 4 Drawing Figures

BELLOWS BOOT FOR SECONDARY BATTERY TERMINALS

BACKGROUND OF THE INVENTION

Secondary batteries have lead plates in a liquid acid electrolyte, and particularly industrial storage batteries have tall or long plates that rest on grids in the bottoms of the batteries. When these plates expand due to oxidation, they push up their lead terminals sealed in the battery covers, which either breaks the covers or loosen their connections with the covers to cause leakage of corrosive vapors from the batteries. It is important to maintain the seal between the terminals of these secondary batteries and their housings.

Connections which permit relative movement between the lead terminals of secondary batteries and their plastic covers and/or casings are known. These connections which permit expansion of the positive battery plates due to oxidation previously comprised sliding friction seals around the terminals that often leaked due to the corrosive vapors from the battery.

Bellows boots to prevent leaks between shafts and their housing which permit relative movement between the shafts and their housings are also known. Furthermore, the molding of rigid plastic into grooves around terminals is also known.

However, there is no known plastic bellows which is molded into grooves around a movable rod-like member, not to mention for sealing a terminal of a secondary battery to prevent leakage around it.

SUMMARY OF THE INVENTION

Generally speaking, the secondary industrial lead storage batteries of this invention each cell of which comprises a non-corrosive plastic rectangular container or housing which is taller than it is wide or deep, into which container are vertically placed a plurality of alternate parallel positive and negative lead plates with porous non-electrical conducting spacers therebetween. The bottoms of these plates are supported on a grid in the bottom of the container. The tops of all of the positive plates are joined together and to a terminal post that projects up through the plastic sealed cover or top of the battery, and similarly all of the negative plates are so connected to another terminal post. The cover of the battery may also be provided with a cap over a hole through which liquid may be added to the electrolyte in the battery container.

During the oxidation of the positive plates, they expand, and since they rest on a rigid bottom support and are long in the axial direction of the terminal post, the post is pushed longitudinally upward causing noticeable relative movement with respect to the battery housing and its sealed cover.

Thus, to prevent breaking-away of the seal of the terminal with the cover and leakage of fumes, there has been provided flexible plastic bellows, such as of polypropylene, sealed between the periphery of the cover and the terminals themselves, which permits non-leaking relative movement of the terminals due to the expansion of their plates. This particular plastic bellows connection, according to this invention, comprises integrally molding at least one end of the bellows into parallel circumferential grooves in the terminal post, and either integrally forming the other end of the bellows into the plastic cover or sealing the other end by heat or sonic vibrations to the plastic cover. The circumferential grooves in the terminal post may be formed in a sleeve of softer lead than the terminal post, to which grooves the one end of the bellows has been molded prior to assembly; or the grooves may be placed in the terminal post itself and have a plastic ring on the one end of the plastic bellows molded directly therein. Thus, each terminal post separately may be provided with its own bellows, or if desired, both terminals including the filler aperture and its cap, may be molded in a bellows integral with the cover of the battery.

The sleeve or upper end of the terminal of the battery may be frusto-conical in shape over which an intercell battery connector with integral frusto-conical sleeves at its ends may be forced and/or pinched by special tool to form it into compressed intimate contact with the terminal post. Or, if desired, the terminal connector may be provided with cylindrical apertures at its ends which snugly fits over a circular ridge in the upper end of the sleeves over the terminal posts, and these cylindrical apertures then may be poured full of hot lead for integrally connecting the connector with the top ends of the terminal posts.

BRIEF DESCRIPTION OF THE VIEWS

The above mentioned and other features, objects and advantages and a manner of attaining them are described more specifically below by reference to embodiments of this invention shown in the accompanying drawings, wherein:

FIG. 1 is a perspective view of a couple industrial secondary battery cells with the lower part of one broken away to show the plates and their supporting grid, and incorporating an oblong bellows in the covers of the cells for connecting both the terminals and the filler cap to the cover according to one embodiment of this invention, and also showing an intercell connector above the terminals of two adjacent cells;

FIG. 11 is an enlarged vertical sectional view through the cover terminals and filler cap shown in FIG. I;

FIG. III is a vertical sectional view similar to FIG. II of another embodiment of this invention showing separate bellows for each terminal and a different type of terminal intercell connector; and FIG. IV is a vertical sectional view similar to FIG. III of still another embodiment of this invention incorporating an intercell connector similar to that shown in FIGS. I and II.

DETAILED DESCRIPTION OF PREFERRED EMBODIMENTS

Figure 1:
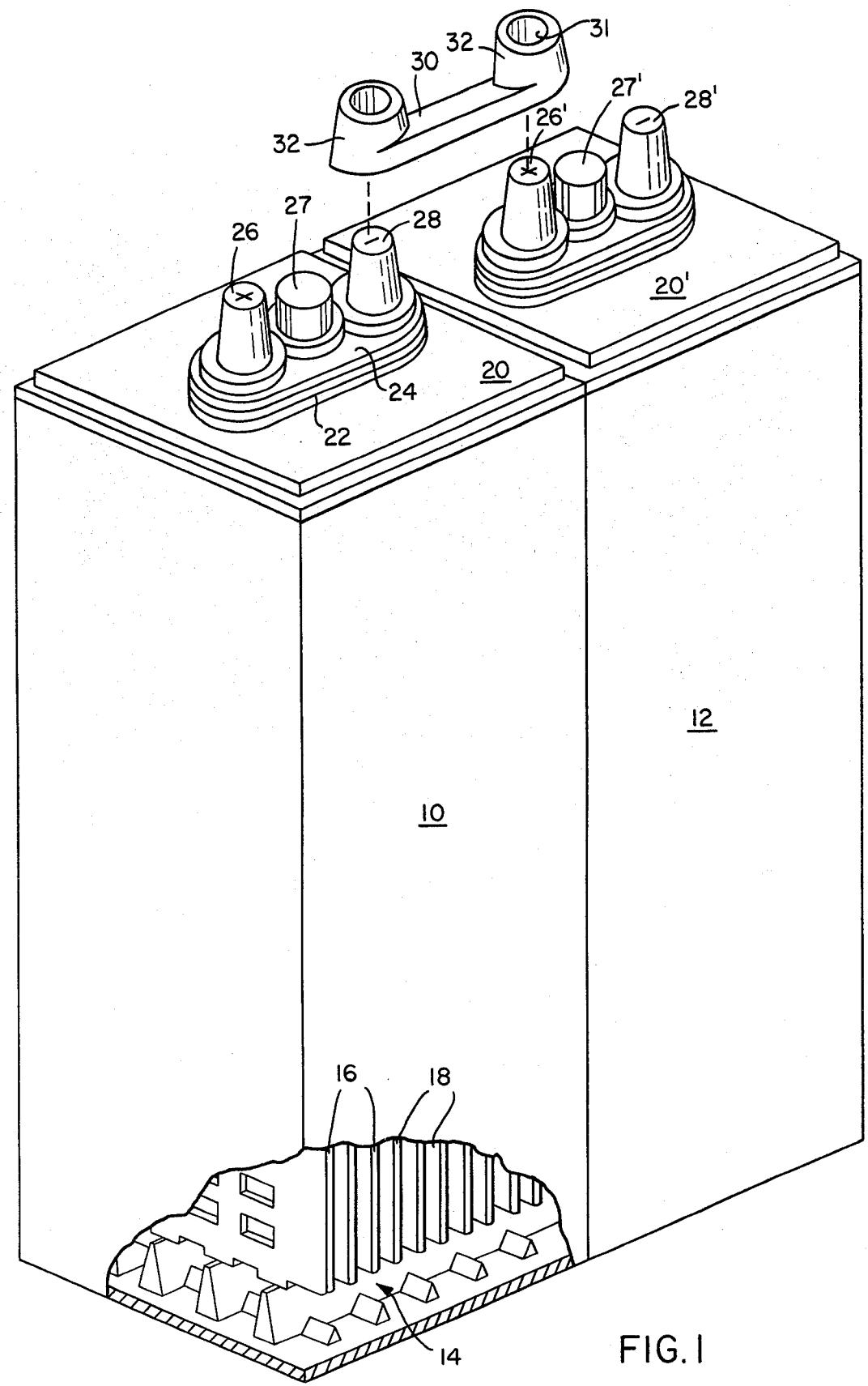
Figure 2:
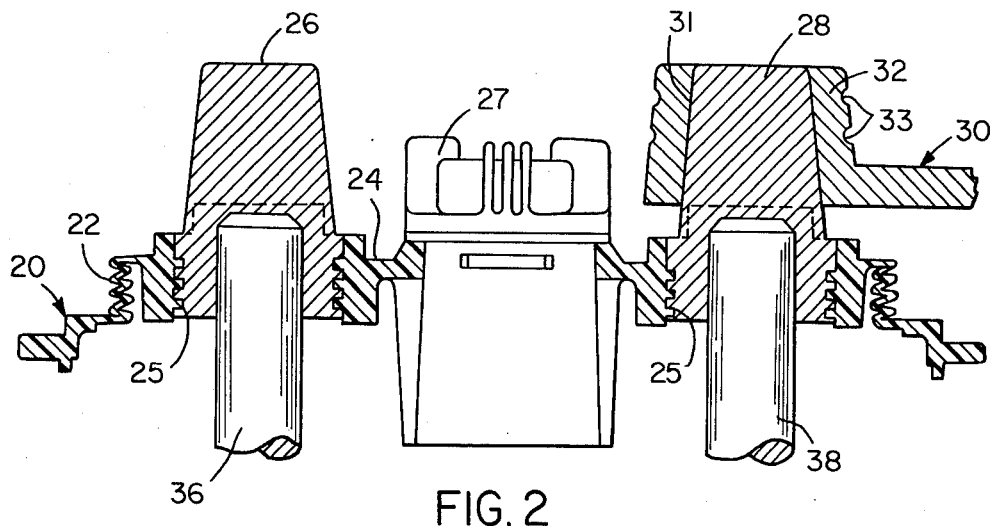
Figure 3:
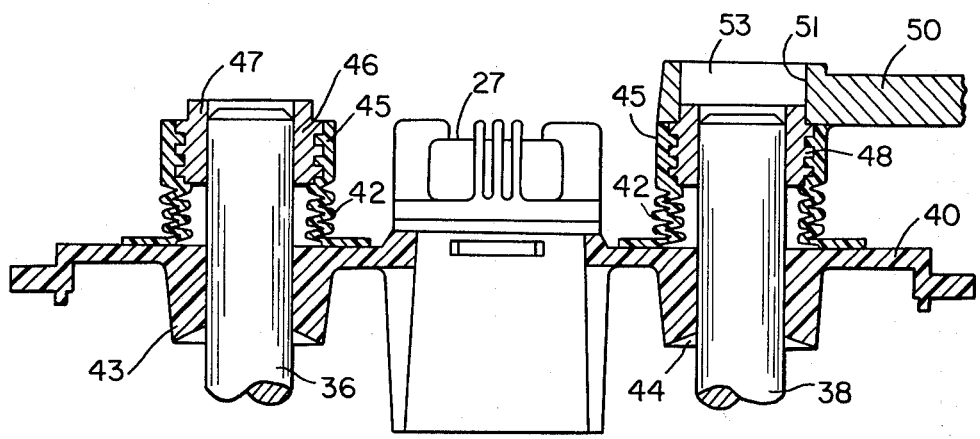
Figure 4:
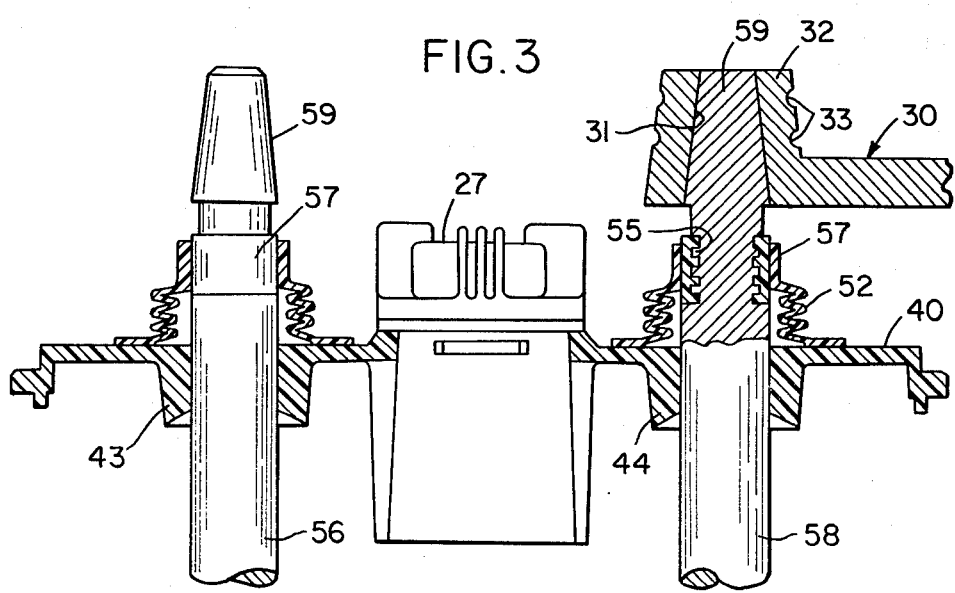

Referring first to FIG. I, there is shown a pair of secondary industrial battery cells 10 and 12, with the bottom corner of cell 10 being broken away to show the supporting grid 14 similar to that shown in Barrett U.S. Pat. No. 3,661,646 issued May 9, 1972 for supporting the lower ends of the alternate positive and negative parallel lead battery plates 16 and 18, respectively. The bottom grid 14 may be formed integral with the bottom of the housing 10 without departing from the scope of this invention. The upper ends of each set of these plates are integrally joined together and joined to the positive 26 and negative 28 terminal posts projecting through the center raised bellows portion 24 of the bellows 22 formed integral with the cover 20. Between the two terminal posts 26 and 28 there is herein shown a removable battery-filling cap 27 covering an aperture in the center of the raised portion 24 for access to fill the battery housing 10 with electrolyte and/or a replenishing liquid.

The similar adjacent cell 12 also has its upper positive and negative terminals 26' and 28' projecting above its cover 20' and the adjacent terminals 26' and 28' may be connected by a lead terminal connector 30 which has frusto-conical apertures 31 at each end thereof in upwardly extending sleeves 32. These sleeves 32 snugly fit over the similar frusto-conical opposite polarity terminal posts 28' and 26' of adjacent cells 10 and 12. Once in place the sleeve portions 32 may be crimped by a special tool (not shown) which forms the grooves 33 shown in FIG. II for integrally clamping the connector 30 onto the terminal posts 28 and 26'. There is also provided (but not shown) a separate type tool which may be used for removing these connectors 30 when the cells 10 and/or 12 have to be repaired or replaced.

In this embodiment these terminal posts 26 and 28, or 26' and 28', comprise softer lead extensions which have been integrally formed onto the upper ends 36 and 38 of the lead terminal posts connected to the upper ends of the positive and negative plates, respectively. These extensions 26 and 28 are frusto-conical at their upper ends and are provided with a plurality of parallel outer circumferential grooves 25 into which the upper end of the bellows 22 is directly molded before the extensions 26 and 28 are attached to the upper ends 36 and 38 of the plates 16 and 18 in assembling a cell. After this is done and the plates 16 and 18 are in their container or cell 10, the periphery of the plastic cover 20 is sealed to the rim of the container 10.

Thus, the oblong or vertically projecting flexible plastic bellows 22 around the terminals 26, 28 and intermediate battery cap 27, are permitted vertical movement caused by expansion of the plates that push their terminals vertically upward, without causing rupture of the cover 20 or leakage by any such rupture or sliding of the joint between the terminal post and cover 20.

Referring now to the embodiment shown in FIG. III, the cover 40 of the battery cell is provided with downward depending guiding sleeve portions 43 and 44 for the upper ends of the positive and negative plate terminals 36 and 38, respectively. The upper ends of these lead terminals 36 and 38 have forced-fit or integrally formed thereon softer lead sleeves 46 and 48 with outer circumferential parallel grooves 45 therein, into which grooves are integrally molded one and the upper end of the flexible plastic bellows 42. The other ends of these bellows 42 are heat or sonically sealed directly and integrally to the upper end of the plastic sleeve portions 43 and 44 of the cover 40. Since the lead grooved sleeves 46 and 48 are connected to the upper ends of the terminals 36 and 38, respectively, they are provided in this embodiment with an upper rim 47 over which fits another type of terminal connector 50, whose cylindrical apertures 51 at opposite ends thereof fit over the rim 47 to provide a cavity 53 into which molten lead (not shown) may be poured for integrally sealing the connector 50 with an extension sleeve 46 and/or 48 and the upper ends of the terminal posts 36 and 38.

Referring now to still another embodiment shown in FIG. IV, the cell cover 40 is similar to that shown in FIG. III; however, the upper ends of the lead terminals 56 and 58 are provided with an integral parallel circumferential grooves 55 into which has been molded directly a plastic sleeve 57. The outside of this plastic ring or sleeve 57 is flush with the post cylindrical diameter 56 and 58 and has the one and upper end of a flexible plastic bellows 52 heat or sonically sealed directly thereto, and the other and lower end of the bellows 52 directly sealed to the cover 40 as in the embodiment in FIG. III. The upper end of the terminals 56 and 58 above the grooves 55 and plastic ring portion 57 is provided with a frusto-conical top 59 integral therewith. These tops 59 are connected to an intercell connector 30, similar to that described above and shown in FIGS. I and II above.

While there is described above the principles of this invention in connection with specific apparatus, it is to be clearly understood that this description is made only by way of example and not as a limitation to the scope of the invention.

I claim:

1. In a battery having a housing and plates therein connected integrally to a terminal post that projects outwardly through an aperture in the top of said housing, the improvement comprising:
   (A) circumferential grooves in said terminal post adjacent said aperture, and
   (B) a flexible convoluted plastic connection extending between said terminal and said top of said housing around said aperture and being molded in said grooves and hermetically sealed to said housing to permit longitudinal movement of said terminal due to expansion and contraction of said plates in said housing.

2. A battery according to claim 1 wherein said battery is a secondary liquid battery and said plates comprise positive plates in said battery.

3. A battery according to claim 1 wherein said housing includes means in the bottom of said housing for supporting said plates in said housing.

4. A battery according to claim 1 wherein said circumferential grooves on said terminal are outside said housing.

5. A battery according to claim 1 wherein said convoluted plastic connection comprises a bellows.

6. A battery according to claim 1 wherein said housing comprises a plastic and said plastic connector is fused to said plastic housing.

7. A battery according to claim 1 wherein the outer end of said terminal is frusto-conical in shape.

8. A battery according to claim 7 including a terminal connector having a frusto-conical aperture for frictionally seating said frusto-conical end of said terminal.

9. A battery according to claim 1 wherein said convoluted plastic connection includes an aperture and a closure for said aperture through which aperture a liquid may be introduced into said battery housing.

10. A battery according to claim 1 wherein said terminal includes a metallic sleeve frictionally attached to the outer end of said terminal, which sleeve contains said circumferential grooves.

* * * * *